United States Patent [19]
Gilbert et al.

[11] Patent Number: 5,212,559
[45] Date of Patent: * May 18, 1993

[54] DUTY CYCLE TECHNIQUE FOR A NON-GRAY SCALE ANTI-ALIASING METHOD FOR LASER PRINTERS

[75] Inventors: John M. Gilbert, Minneapolis; Lawrence J. Luckis; Leonard R. Steidel, both of Prior Lake, all of Minn.

[73] Assignee: LaserMaster Corporation, Eden Prairie, Minn.

[*] Notice: The portion of the term of this patent subsequent to Aug. 20, 2008 has been disclaimed.

[21] Appl. No.: 591,537

[22] Filed: Oct. 2, 1990

Related U.S. Application Data

[63] Continuation-in-part of Ser. No. 434,318, Nov. 10, 1989, Pat. No. 5,041,848.

[51] Int. Cl.$^5$ .............................................. H04N 1/21
[52] U.S. Cl. .................................... 358/298; 346/108
[58] Field of Search ............... 358/298, 296, 300, 302; 364/519; 346/107 R, 108, 160

[56] References Cited

U.S. PATENT DOCUMENTS

| | | |
|---|---|---|
| 4,079,367 | 3/1978 | Yonezawa et al. |
| 4,119,956 | 10/1978 | Murray |
| 4,232,343 | 11/1980 | Sommer |
| 4,482,893 | 11/1984 | Edelson |
| 4,591,897 | 5/1986 | Edelson |
| 4,593,278 | 6/1986 | Koos, Jr. et al. |
| 4,630,947 | 12/1986 | Yoshida et al. |
| 4,674,059 | 6/1987 | Schrieber |
| 4,679,039 | 7/1987 | Neil et al. |
| 4,680,645 | 7/1987 | Dispoto et al. |

(List continued on next page.)

OTHER PUBLICATIONS

Automatic Generation of Digital Typographic Images From Outline Masters; Phillip G. Apley; Bitstream, Inc. Character Generation Under Grid Constraints; Hersch, Roger D; Comptuer Graphics, vol. 21, No. 4, Jul. 1987. Intelligent Font Scaling and a Universal Format for Communication of Font Data; Jutzi, Curtis; Tektronix, Inc.

*Primary Examiner*—Mark J. Reinhart
*Attorney, Agent, or Firm*—Patterson & Keough

[57] ABSTRACT

A non-gray scale anti-aliasing method for smoothing one or more edges of an image to be printed by a binary imaging printer. The image is generated by rasterizing an ideal outline of the image using a processor means for processing a plurality of raster lines to form a pixel representation of the image to be communicated to the binary imaging printer. An ideal fill area representing the area inside the ideal outline for the pixel currently being processed is determined for each pixel in the raster line and then compared to at least a first and second comparison value. Based upon the comparison, a determination is made as to whether the pixel currently being processed will be turned on or turned off. In one embodiment, the comparison is made by the use of a lookup table having a set of predetermined comparison values that contain estimated fill values used by an accumulator to determine whether to selectively modify the pixel. In a different embodiment, the lookup table is replaced by using a fill function for translating the ideal fill value into the estimated fill value. In another embodiment, a control signal having a predetermined duty cycle is generated for all pixels within a boundary transition range defined by the first and second comparison values.

27 Claims, 7 Drawing Sheets

FOREIGN PATENT DOCUMENTS

| | | |
|---|---|---|
| 4,692,189 | 7/1987 | Purdy et al. |
| 4,704,605 | 11/1987 | Edelson |
| 4,710,764 | 12/1987 | Van Cang |
| 4,736,310 | 4/1988 | Colthorpe et al. |
| 4,770,552 | 9/1988 | Nishijima et al. |
| 4,780,711 | 10/1988 | Doumas |
| 4,785,391 | 11/1988 | Apley et al. |
| 4,794,405 | 12/1988 | Kennedy, Jr. |
| 4,796,020 | 1/1989 | Budrikis et al. |
| 4,811,245 | 3/1989 | Bunker et al. |
| 4,811,409 | 5/1989 | Cavan |
| 4,816,817 | 3/1989 | Herrington |
| 4,817,172 | 3/1989 | Cho |
| 4,819,185 | 4/1989 | Corona et al. |
| 4,827,352 | 5/1989 | Yoneda et al. |
| 4,841,377 | 6/1989 | Hiratsuka et al. |
| 4,843,380 | 6/1989 | Oakley et al. |
| 4,849,910 | 7/1989 | Jacobs et al. |
| 4,881,069 | 11/1989 | Kameda et al. |
| 4,905,166 | 2/1990 | Schuerman |
| 4,908,780 | 3/1990 | Priem et al. |
| 4,933,866 | 6/1990 | Markoff et al. |
| 4,959,801 | 9/1990 | Arley et al. |
| 5,005,139 | 4/1991 | Tung ............................ 364/519 |
| 5,041,848 | 8/1991 | Gilbert et al. ................ 346/108 |

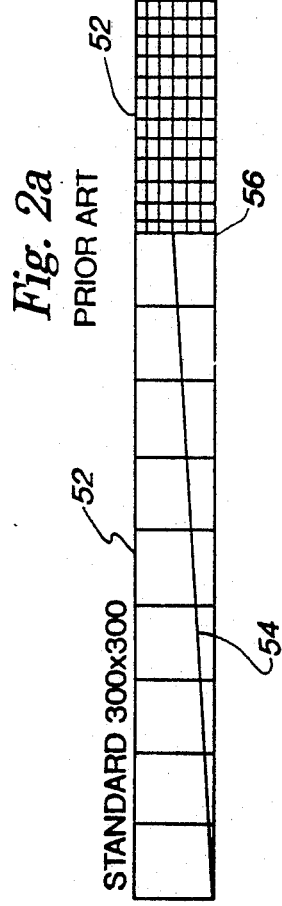
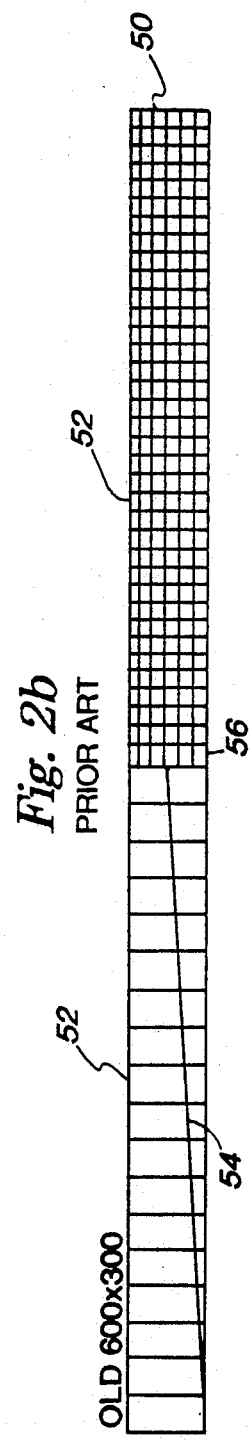
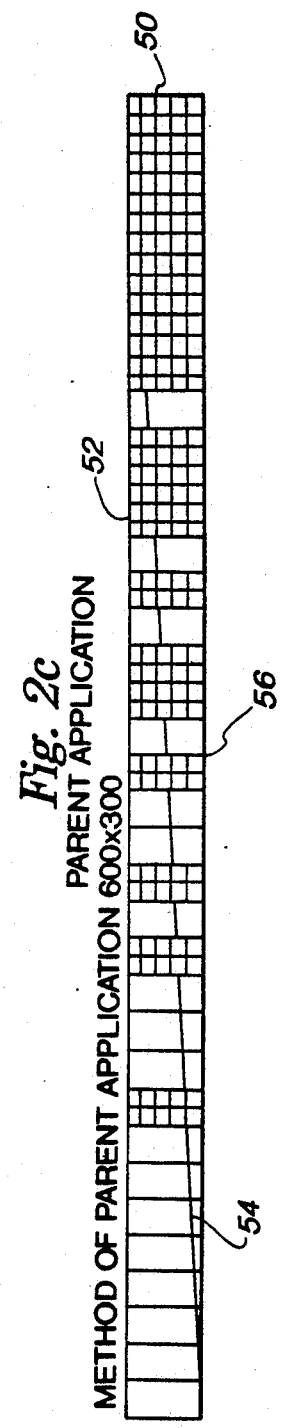
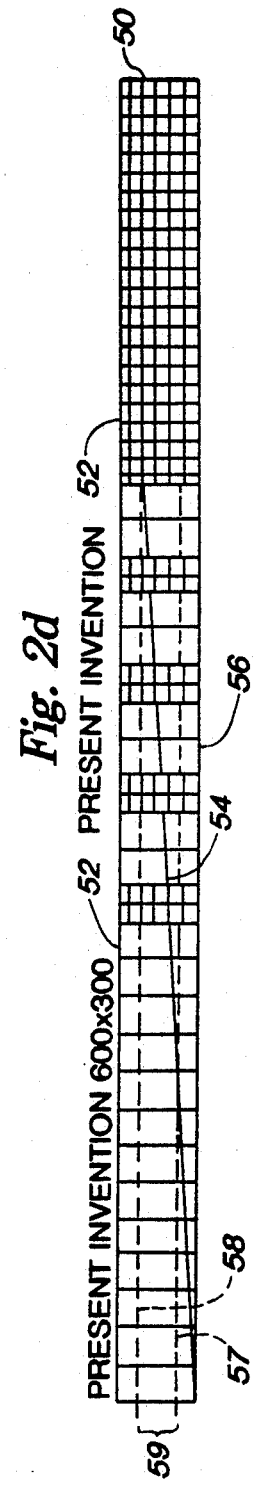
Fig. 2a PRIOR ART
Fig. 2b PRIOR ART
Fig. 2c PARENT APPLICATION
Fig. 2d PRESENT INVENTION

PRESENT INVENTION

PRIOR ART (5x)

PRESENT INVENTION (5x)

DUTY CYCLE TECHNIQUE FOR A NON-GRAY SCALE ANTI-ALIASING METHOD FOR LASER PRINTERS

RELATED APPLICATION

This application is a continuation-in-part of an application by the same inventors and assigned to the same assignee as the present invention entitled NON-GRAY SCALE ANTI-ALIASING METHOD FOR LASER PRINTERS, Ser. No. 07/434,318, filed Nov. 10, 1989, and issued as U.S. Pat. No. 5,041,848.

TECHNICAL FIELD

This invention pertains to methods of rasterization and fill techniques used to create images for binary imaging devices, such as laser printers. More particularly, this invention pertains to a duty cycle technique for a non-gray scale anti-aliasing method for smoothing the edges of an image to be produced by a laser printer.

BACKGROUND ART

In recent years, the use of smaller, inexpensive laser printers with personal computers has created an entirely new industry referred to as desktop publishing. Desktop publishing systems offer users the ability to format and print documents having complicated layouts using characters that have a variety of different fonts and type sizes. While desktop publishing systems represent a significant advance in the art of publishing, the standard resolution of the laser printers used with such systems (typically a 300×300 dots per inch (dpi) Canon CX or SX-based laser printer, e.g. a Hewlett Packard LaserJet Series II printer) was too poor to compete with traditional phototypesetting systems.

In an effort to improve the quality and speed of the smaller, inexpensive laser printers used with desktop publishing systems, a variety of printer controller cards have been introduced that may be installed either in the laser printer or in the personal computer. Certain of the printer controller cards that are installed directly in the personal computer increase the quality and speed of the laser printers by using a separate co-processor and page frame buffer to create a pixel representation of the image to be printed on the laser printer. This image is then printed from the pixel representation in the page frame buffer by directly controlling the modulation of the laser in the print-engine of the laser printer. An example of such a printer control card is the LX6 Professional printer controller cards available from LaserMaster Corporation, Eden Prairie, Minn., the assignee of the present invention.

In some of the prior art printer controller cards, such as the LX6 Professional, it is possible to increase the horizontal resolution of the laser printer by controlling the modulation of the laser in the print-engine of the laser printer. By doing so, the LX6 Professional printer controller cards can increase the horizontal component of the pixel resolution of the laser printer to 600×300 dpi or 1000×400 dpi, depending upon the type of laser printer. This increase in horizontal resolution significantly improves the quality of the resulting printed image, particularly for pixel transition points along the outline edges of a character or image that occur in the vertical or near vertical orientation. Unfortunately, the increased horizontal resolution does little to improve the quality of the outline edges of a character or image that are near horizontal in slope.

The noticeability and appearance of such vertical pixel transition points is typically referred to as aliasing that results in jagged or stairstep edges of the character or image outline oriented generally in the horizontal direction. Traditionally, anti-aliasing techniques incorporating a gray-scale approach have been used in video displays to resolve this type of problem. Unfortunately, laser printers are binary imaging devices and are not capable of implementing such gray-scale techniques. In larger and more expensive laser printers, the problems associated with aliasing and non-smooth edges may be resolved by using higher pixel resolutions in these printers. In the smaller, inexpensive laser printers used, for example, with desktop publishing systems, this approach is not used because of the associated increase in cost.

In accordance with the parent application of the present invention, a non-gray scale anti-aliasing method for smoothing the horizontal components of the edges of an image to be printed by a laser printer having unequal pixel resolutions in the horizontal and vertical dimensions is described. The method was specifically described for use by a processor that is provided with an ideal outline of the image and then rasterizes the ideal outline of the image using the processor for determining which pixels to turn on and which pixels to turn off in a frame buffer that stores a pixel representation of the image to be printed by the laser printer. The smoothing is accomplished by selectively modifying the one and off states of pixels on either side of each vertical transition point along the horizontal components of raster lines representing the edges of the pixel representation of the image.

It will be recognized that the pixel representation created in the frame buffer for each horizontal raster line is used to control the laser in the laser printer. When the laser is turned on in response to an "on" pixel, a generally circular laser beam image is reflected on the print drum of the print engine to transfer charge elements to the drum. The charge elements attract and pick up toner that is then transferred to a sheet of paper. Although the pixel elements are thought of as square or rectangular shapes, in actuality, the edges of the pixels typically bleed into one another.

In essence, the parent application for the present invention taught that the vertical transition points in the horizontal raster lines could be smoothed by selectively adding and subtracting pixels around the transition points. In the preferred embodiment of the parent application, the smoothing of the horizontal components of the edges of the ideal outline is accomplished during the rasterization fill process for each horizontal raster line. As each line is rasterized, the processor accumulates a running fill value that represents the area of each pixel inside the ideal outline that should be turned "on" or filled. If the processor determines that the area of the fill value is greater than the area of a pixel, the pixel presently being processed is turned "on" and the area of a pixel is subtracted from the fill value. In this embodiment, the fill value acts like a running accumulator with the carry out of the accumulator being used to determine whether the pixel presently being processed should be turned "on".

The use of the preferred technique taught by the parent application is effective in smoothing vertical transition points of images to be printed on many different types of laser printers. However, it has been found that differences in the print engines among laser printers can result in varying degrees of smoothness of vertical transition points using the particular technique of accumulating the area of each pixel inside the ideal outline to determine whether to selectively turn "on" a particular pixel. It is believed that the success in smoothing vertical transition points is affected by the response of the laser printer to the video control signal that modulates the laser.

For example, the fact that different types of print engines have uniquely different sizes, shapes and power densities associated with their laser beam spot images can affect the way in which toner will be deposited on the drum in response to a particular video control signal. For certain print engines, the buildup of toner from the bottom to the top of a raster line in response to a control signal will behave in a generally linear fashion as the duty cycle of the control signal is increased. In other print engines, the buildup of toner from the bottom to the top of a raster line will behave in a more non-linear fashion in response to the duty cycle of the control signal.

Unfortunately, the preferred technique of accumulating a fill value taught by the parent application is limited in its ability to compensate for the differences in how toner is deposited in response to the video control signals in different laser printers. Accordingly, it would be desirable to provide for new techniques for adapting the non-gray scale anti-aliasing method of the parent application to a wide variety of laser printers having different ways in which toner will be deposited in response to a control signal, especially those laser printers where the buildup of toner from the bottom to the top of a raster line behaves in a non-linear fashion in response to the duty cycle of the control signal.

SUMMARY OF THE INVENTION

The present invention is a non-gray scale anti-aliasing method for smoothing one or more edges of an image to be printed by a binary imaging printer. The image is generated by rasterizing an ideal outline of the image using a processor means for processing a plurality of raster lines to form a pixel representation of the image to be communicated to the binary imaging printer. For each pixel in the raster line an ideal fill area representing the area inside the ideal outline for the pixel currently being processed is determined. This ideal fill area is then compared to at least a first and second comparison value. Based upon the comparison of the ideal fill area and the first and second comparison values, a determination is made as to whether the pixel currently being processed will be turned on or turned off.

For those raster lines that contain a generally horizontally-oriented or oblique component of one or more of the edges of the image to be printed, the raster line may have one or more vertical transition points. The vertical transition point represents a boundary condition along an oblique component of an edge of the image where the ideal outline crosses the midpoint of the height of a pixel in the raster line. The first and second comparison values establish a boundary transition range for the boundary condition above and below which the pixels on either side of the vertical transition point should either be turned on or turned off, respectively. If the ideal fill area is between the first and second comparison values and within the boundary transition range, then the on or off state of the pixel is selectively modified to smooth the vertical transition point. The use of the first and second comparison values in accordance with the present invention to establish a boundary transition range for vertical transition points differs from the prior art techniques of using a single comparison point, typically the half-way point of the height of the pixel, as the test for whether the pixel should be turned on or turned off.

In the preferred embodiment, the present invention can accommodate a wide variety of laser printers having different ways in which toner will be deposited in response to a control signal by providing a lookup table representing a set of predetermined comparison values for the particular laser printer. In this way, the lookup table can contain multiple comparison values, including the first and second comparison values that establish the boundary transition region. The determination of whether a pixel should be on or off is made by selecting an estimated fill value using the ideal fill area to retrieve a comparison value from the lookup table. An actual fill value for the raster line is maintained by accumulating the estimated fill values. If the actual fill value is greater than the total area of a single pixel, the pixel currently being processed is turned on and the actual fill value is reset.

For example, consider the case where the ideal fill area is calculated in terms of a two-digit percentage of the total area of a single pixel. In this case, the lookup table would contain one hundred entries, each entry being a comparison value that represents the estimated fill value to be used for the associated percentage. If the first and second comparison values are determined to be 25% and 75% of the total area of a single pixel, respectively, then the values in the lookup table from 0–25 are set to "0" or off, and the values from 75–100 are set to "1" or on. As the estimated values below the first comparison value are accumulated, the pixels are not turned on because the estimated value is always zero. In the boundary transition range between 25% and 75%, the values in the lookup table can be set to produce whatever control signal provides the best smoothing effect for the particular laser printer, such as "0.33" to produce a one-third duty cycle signal for all pixels that are within the boundary transition range for a given vertical transition point. Finally, when the ideal fill area is greater than the second comparison value, the pixels are now turned on because the estimated value is always one. In a different version of this embodiment, the lookup table is replaced by a fill function for directly determining the estimated fill value based upon the ideal fill area.

In another embodiment, the first and second comparison values are also established as a predetermined percentage of the total pixel area, such as 33% and 67%. If the ideal fill value for a particular pixel is within the boundary transition range from 33% to 67%, then the on or off state of the pixel is set according to a predetermined duty cycle, such as 25%. In the situation of a generally horizontal segment of an edge of the ideal outline, there will be a number of consecutive pixels that are within the boundary transition range. For those pixels in the generally horizontal segment that have ideal fill values less than 33% of the total pixel area, the pixels would be off. Similarly, for those pixels in the generally horizontal segment that have ideal fill values greater than 67% of the total pixel area, the pixels would be on. For the pixels within the boundary transition range, a fill pattern is created using a 25% duty cycle that would turn the first pixel on and the next three pixels off, with the pattern repeating until the ideal fill value is outside the boundary transition range. It will also be understood that additional comparison values could also be incorporated into this technique to provide for multiple boundary transition ranges, each boundary transition range possibly having a unique duty cycle.

It will be recognized that the optimum values for the first and second comparison values, as well as the estimated fill values in the lookup table or produced by the fill function, or the duty cycle of the fill pattern in the boundary transition range will vary with the particular binary imaging printer. For example, in a limiting case of the two-digit percentage embodiment previously described, the first and second comparison values could be set a 0% and 100%, respectively. The ability to vary these parameters provides a technique that allows the anti-aliasing smoothing method taught by the parent application to be utilized by a variety of laser printers where the buildup of toner from the bottom to the top of a raster line behaves in a non-linear fashion in response to the duty cycle of the control signal. In addition, as taught by the parent application, there are many different ways of determining or estimating the ideal fill area for the pixel currently being processed that may also be utilized by the present invention.

The parent application of the present invention taught that the method of selectively modifying pixels around a vertical transition point was effective at providing a non-gray scale anti-aliasing method for laser printers having unequal horizontal and vertical resolutions. It was thought that this method was effective due to the fact that the laser power function at the surface of the drum typically decreases with the distance from the center of the focal point over a generally circular or elliptical area covering a space larger than the theoretical rectangular pixel. Because the total laser power impinging on a given point determines the resulting amount of charge on the drum at that point which in turn determines whether toner will stick to that point or not, and because the laser beam spot image is larger than the theoretical pixel, the total laser energy impinging upon a given point on the drum may have components contributed by more than a single sweep of the laser beam.

It is believed that the present invention takes advantage of the physics of this process at the higher laser modulation rates to create the desired smoothing of raster lines having vertical transition points. For edges in the near horizontal raster line just below the outline edge, some of those charge elements overlap onto the next horizontal raster line that contains the outline edge with the transition point. In that next horizontal line, the application of the laser in response to the modified pixel representation briefly turns the laser on, for example, for a selectively modified "on" pixel prior to the transition point. The duration of this pulse of laser energy is insufficient to charge this pixel location enough to attract toner; however, in the overlap region, sufficient charge may be added to the charge already deposited by the lower raster line to alter the boundary of the region in which toner sticks to the drum. Thus, in effect, the location of a horizontal edge of the image may be controlled to within less than the height of a full pixel.

The present invention also recognizes that for laser printers where the buildup of toner from the bottom to the top of a raster line behaves in a non-linear fashion in response to the duty cycle of the control signal, it is desirable to selectively modify the control signal by the application of a pseudo-duty cycle signal based upon the selective modification of pixels within the boundary transition range. It is believed for these types of laser printers that behave in a generally non-linear fashion, the physics of the overlapping of vertically adjacent pixels is such that there are an upper and lower limit to the duty cycle of the control signal that practically limit the effectiveness of the present invention.

Take the example of the selective modification of pixels around a vertical transition point having one pixel being turned on, followed by the next four or five pixel being turned off. In this example, the selective modification would effectively result in a duty cycle for that portion of the control signal of less than 20%. In certain laser printers, a 20% duty cycle is below the lower limit of the effective duty cycles and the result would be no appreciable change in the height of the toner deposit in response to that control signal. In this case, it appears that the selectively modified pixels are simply too far apart to have any practical effect on the toner deposit of adjacent pixels. Similarly, if the duty cycle is too high, such as two pixels on and one pixel off, the 67% duty cycle is above the upper limit for the effective duty cycle and the result is that the raster line is completely black with no appreciable change or decrease in the height of the toner deposit.

The most significant advantage of using the smoothing method of the present invention is achieved in conjunction with a laser printer having unequal resolutions in the horizontal and vertical dimensions. Although the resolution of the laser printer may be 600×300 dpi, the image produced using the method of the present invention will more closely resemble 600×600 dpi print quality. An additional advantage is that this increase in quality is accomplished using the modified pixel representation in a frame buffer memory that occupies half of the space of the frame buffer memory required to produce an equivalent pixel representation for a higher resolution printer. As a result less memory is needed for the printer controller card and the printer controller card is less expensive.

A primary objective of the present invention is to provide new techniques for adapting the non-gray scale anti-aliasing method of the parent application to binary imaging printers having different responses to the control signal.

Another primary objective of the present invention is to provide a non-gray scale anti-aliasing method that is especially adapted for laser printers having unequal resolutions in the horizontal and vertical dimensions.

A further primary objective of the present invention is to provide a method for smoothing vertical transition points where the buildup of toner from the bottom to the top of a raster line behaves in a non-linear fashion in response to the duty cycle of the control signal.

Another objective of the present invention is to increase the quality of the image printed using a printer controller card without increasing the amount of frame buffer memory required to store the pixel representation of that image.

A further objective of the present invention is to increase the quality of the image printed using a printer controller card without requiring additional hardware circuitry on the printer controller card or the print engine of the laser printer.

Still another objective of the present invention is to implement the smoothing method of the present invention during the fill process of the rasterization of the pixel representation of the image without requiring any post-rasterization processing or circuitry to accomplish the smoothing of the images.

These and other objectives of the present invention will become apparent with reference to the drawings, the detailed description of the preferred embodiment and the appended claims.

DESCRIPTION OF THE DRAWINGS

FIGS. 2a, 2b, 2c and 2d are schematic pixel representations of a shallow horizontal outline edge for two prior art pixel representations, the modified pixel representation in accordance with the parent application of the present invention the modified pixel representation in accordance with the present invention.

DESCRIPTION OF THE PREFERRED EMBODIMENTS

Figure 5:
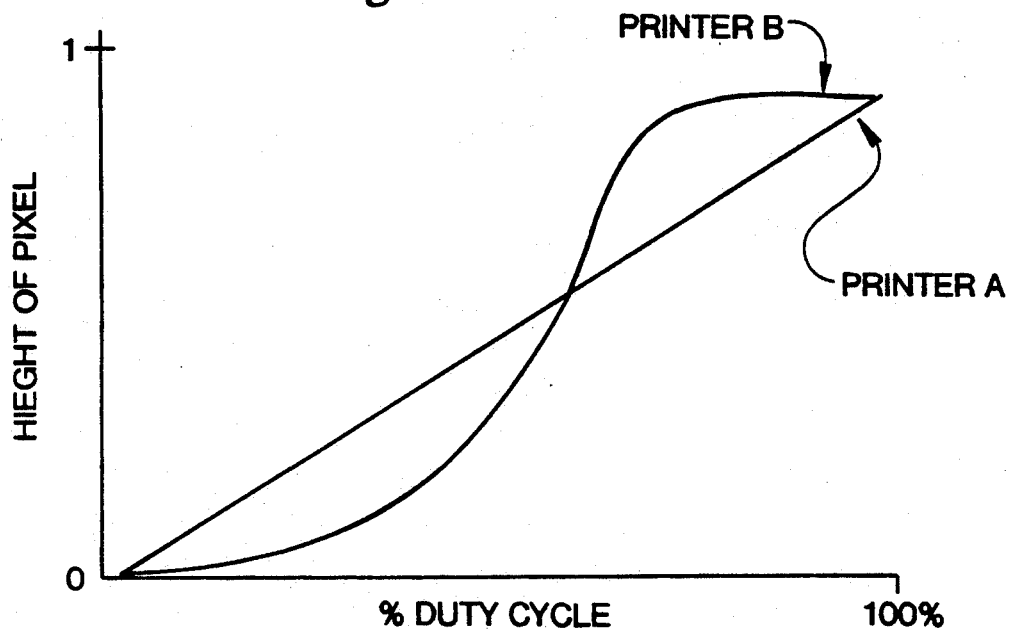
FIG. 5 is a graphical representation of the toner deposit functions of two different laser printers.
Figure 6A:
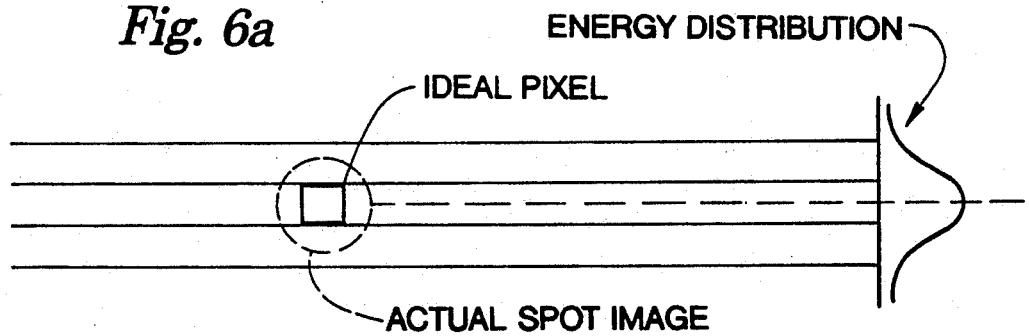
FIGS. 6a and 6b are graphical representations of the spot images of the two different laser printers.
Figure 6B:
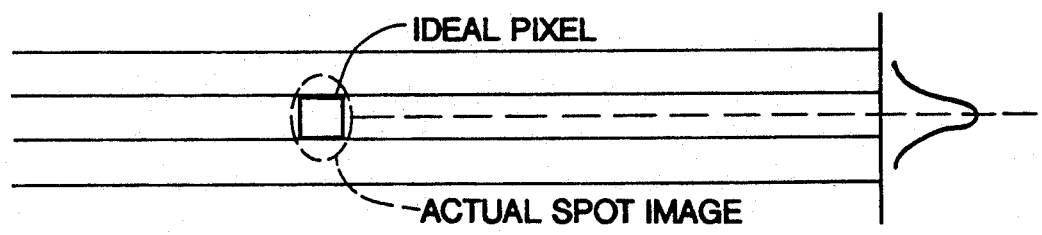

Referring to FIGS. 5 and 6a and 6b, a background explanation why it is believed that the present invention is effective in smoothing the edges of an image to be printed by a binary imaging printer will be presented. Different types of print engines having uniquely different sizes, shapes and power densities associated with their laser beam spot images can affect the way in which toner will be deposited on the drum in response to a particular video control signal. FIG. 5 shows the response function of two different laser printers to a control signal having a varying duty cycle. The response function is plotted in terms of the buildup of toner from the bottom to the top of a raster line for the vertical height of a single pixel (vertical axis) versus the percentage duty cycle of the control signal (horizontal axis) As shown by the function for print engine A, the buildup of toner from the bottom to the top of a raster line for this print engine in response to the control signal behaves in a generally linear fashion as the duty cycle of the control signal is increased. In other print engines, such as shown by the function for print engine B, the buildup of toner from the bottom to the top of a raster line will behave in a non-linear fashion in response to the duty cycle of the control signal.

It is believed that the differences in the toner buildup function in response to the duty cycle of a control signal for a particular print engine are due, in part, to the different type of spot images produced by different print engines. As shown in FIG. 6a, if the energy distribution function is a smooth gaussian function, then the toner buildup function will be linear and the best approach is to accumulate the "area error" as described in the parent application to the present invention. On the other hand, if the energy distribution function is like that shown in FIG. 6b (more exponential with a sharper center band most likely due to focusing of the laser beam by more expensive optics), then the toner buildup function in response to the duty cycle of a control signal will be non-linear. In this case, the technique of accumulating the area error may not result in the desired smoothing because of the smaller degree of overlap among vertically adjacent pixels.

Referring again to FIG. 5, the present invention allows the method of smoothing the edges of an image by selectively modifying pixels around the vertical transition points as taught by the parent application to be utilized with binary imaging printers having a non-linear toner buildup function in response to the duty cycle of a control signal. As will be apparent from the figure, there are an upper and lower limit to the duty cycle of the signal, above and below which there is no practical effect on the height of the toner deposit in response to the control signal. Below the lower limit, the selective modification of pixels at these lower duty cycles does not result in any appreciable modification upward to the edge of the image. Similarly, above the upper limit, the selective modification of pixels at these higher duty cycles does not result in any appreciable modification downward to the edge of the image. However, the inventors of the present invention have discovered that a control signal having a duty cycle within these upper and lower limits can be effective in controlling the buildup of toner, even for those print engines having non-linear toner buildup in response to the control signal.

Figure 1:
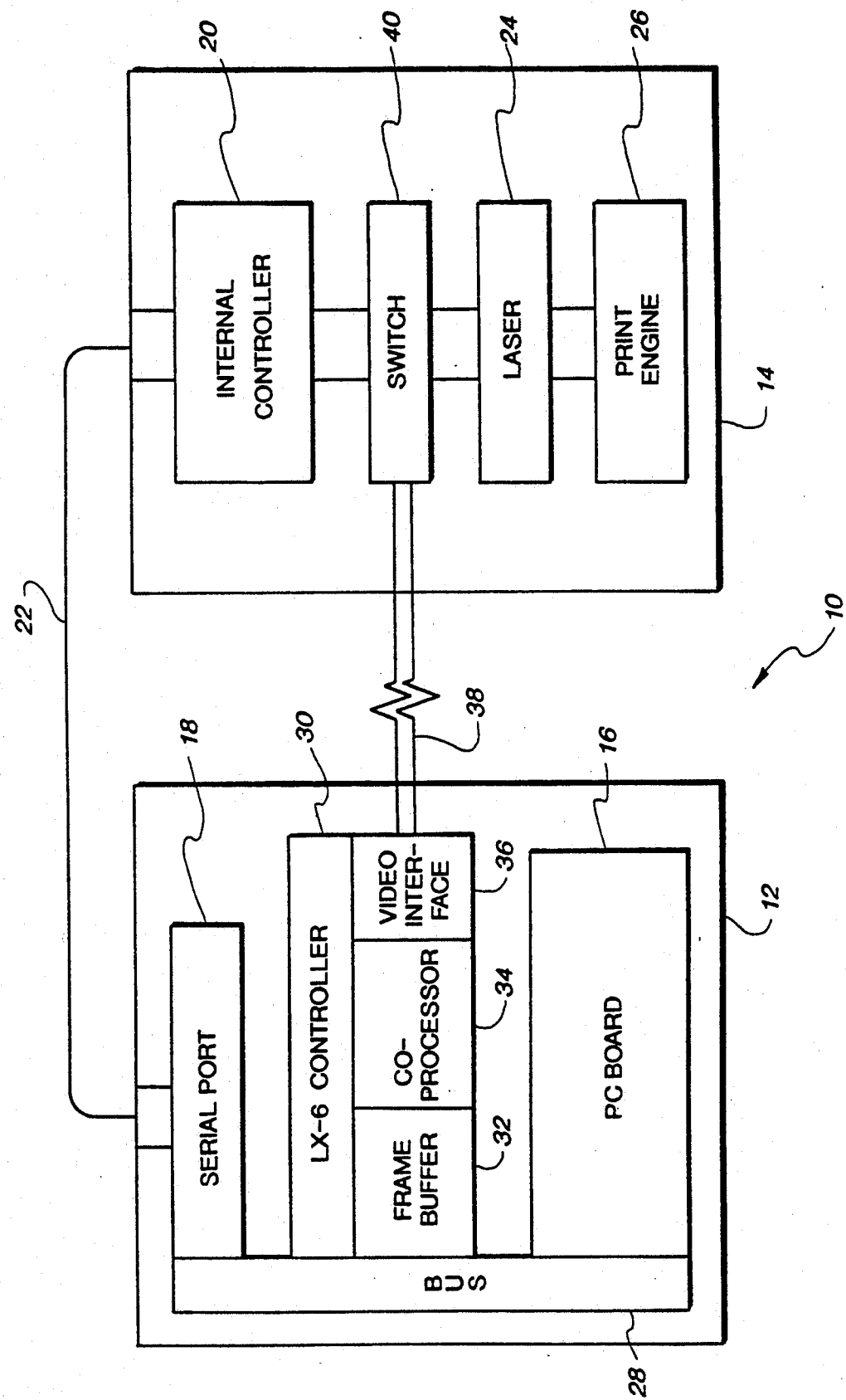
FIG. 1 is a block diagram of laser printing system having a printer controller card for generating an image to be printed by a laser printer having unequal resolutions in the horizontal and vertical dimensions.

Referring now to FIG. 1, a typical desktop publishing system 10 having the printer controller card that executes the software that comprises the preferred embodiment of the present invention will be described. The hardware for the desktop publishing system 10 is comprised of a personal computer 12 connected with a small, inexpensive laser printer 14. The personal computer 12 may be any one of a variety of personal computers such as an IBM PC, XT/AT, 386, or PS/2, available from International Business Machines, Armonk, N.Y., or an Apple Macintosh, available from Apple Computers, Inc., Cuppertino, Calif. The personal computer 12 may be provided with a desktop publishing software package, such as Ventura Publisher, available from Xerox Corporation, PageMaker, available from Aldus Corporation, or GEM Desktop Publisher, available from Digital Research, Inc. The laser printer 14 may be any type of Canon CX or SX laser printer such as the HP LaserJet Series II available from Hewlett Packard, the LaserWriter, available from Apple Computer, Inc., or the Canon LBP8-III, available from Canon.

In normal operation without a printer controller card, the personal computer 12 includes a main PC mother board 16 and a serial port 18 through which the personal computer 12 communicates with the internal controller 20 of the laser printer 14. The computer 12 sends a serial bit stream to the laser printer 14 over an RS-232-C serial interface 22 in the form of various commands and data that represent the image to be printed by the laser printer 14. The internal controller 20 decodes the serial bit stream and generates the control signals that will be supplied to the laser 24 to drive the print engine 26 that creates the printed images corresponding to the various commands and data received by the internal controller. For a more detailed explanation of the internal operation of the laser printer 14, reference is made to the LaserJet II Printer User's Manual, Edition 1, available from Hewlett-Packard.

Because of the inherent limitations on the speed at which the commands and data can be transferred over the serial interface and decoded by the internal controller 20, the page throughput for the laser printer 14 is typically very low, 6 pages per minute or less, depending upon the formatting and type of information being printed. To solve this problem and to simultaneously increase the quality and performance features of the laser printer, various printer controller cards 30 have been introduced into desktop publishing systems, such as the LX6 Professional, available from LaserMaster Corporation, Eden Prairie, Minn. The printer controller card 30 of the preferred embodiment is located in the personal computer 12 and communicates directly with the PC mother board 16 via an internal bus 28. It will be recognized, however, that the printer controller card 30 may be located in the laser printer 14 or that the present invention may be implemented within the internal controller 20 of the laser printer 14.

In the preferred embodiment, the printer controller card 30 is an LX6 Professional printer controller card selected to match the particular type of laser printer 14 being used in the desktop publishing system 10. The LX6 Professional controller consists of a frame buffer 32, a co-processor 34 and a video interface 36. The co-processor 34 receives the various commands and data representing the image to be printed from the PC mother board 16 via the bus 28. Because the bus 28 is a parallel bus, the transfer rate is much faster than for the serial port 18. The co-processor 34 decodes the commands and information and produces a mathematically pure ideal outline corresponding to a filled polygon that will represent each image or character to be printed. The co-processor 34 may also aid the personal computer 12 in rendering lines, graphics and characters as determined by the particular application software package currently being run on the personal computer 12.

Once the ideal outline is generated, it is then filled in or "rasterized" to produce a pixel representation of the image to be printed that is stored in the memory of the frame buffer 34. Any number of known fill techniques or algorithms may be used to fill in the pixels inside the outline, depending upon how overlapping images are to be handled. When the laser printer 14 is ready to print a page or "frame" worth of images, the pixel representation in the frame buffer 34 is transferred to the laser printer 14 via the video interface 36 in the printer controller 30 that communicates directly with the laser 24 via a video cable 38. An internal switch 40 in the laser printer 14 allows the printer controller 30 to override the internal controller 20 of the laser printer and directly modulate the laser 24. It is this direct modulation of the laser 24 that allows the printer controller 30 to increase the horizontal resolution of the laser printer 14. For a more detailed explanation of the operation of the LX6 Professional controller 30, reference is made to the LX User Guide, which is incorporated herein by reference and is available from LaserMaster Corporation.

Figure 3A:
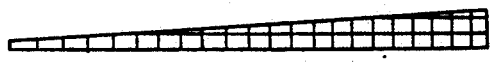
FIGS. 3a and 3b are actual sample printouts of the same filled polygon having a shallow horizontal edge using a prior laser printing system and a laser printing system incorporating the present invention.
Figure 3B:
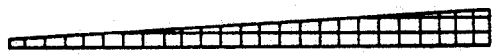
Figure 4A:
FIGS. 4a and 4b are the same sample printouts as shown in FIGS. 3a and 3b shown in 4× scale.
Figure 4B:
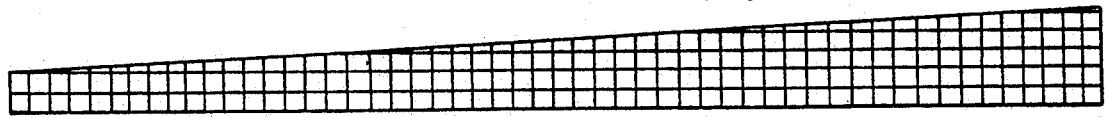

Referring now to FIGS. 2a-2c, the differences between the smoothing method of the present invention and the prior art will be described. Each of FIGS. 2a-2c show a single horizontal raster line 50 comprised of a plurality of pixels 52 that may either be white ("off") or black ("on"). Also shown is the ideal line 54 that forms the outline of the image or character to be printed. In this case, the ideal line 54 is the worst case version of a shallow horizontal line for the edge of an outline. The prior art is represented by the 300×300 dpi raster line 50 generated by the internal controller 20 as shown in FIG. 2a, and the 600×300 dpi raster line 50 generated by the LX6 Professional controller 30 without using the method of the present invention. It can easily be seen that there is a very definite and sharp vertical transition point 56 at the edges of the two pixels adjacent the point where the ideal line 54 crosses the midway vertical height of the pixels 52. This definite and sharp vertical transition point 56 creates jagged edges or "steps" that are visible to the human eye as shown for example in FIGS. 3a and 4a. In contrast, the raster line 50 shown in FIG. 2c that is generated by the LX6 Professional controller 30 using the method of the parent application of the present invention does not have such a sharp black-and-white vertical transition point 56. Similarly, the raster line 50 shown in FIG. 2d that is generated by the LX6 Professional controller 30 using the method of the present invention also does not have such a sharp black-and-white vertical transition point 56. By selectively turning on pixels in the raster line 50 to the left of the transition point 56 and turning off pixels to the right of the transition point 56, the present invention smooths the transition point 56 as seen by the human eye as shown for example in FIG. 3b and 4b. Vertical and near vertical edges may also be smoothed in much the same fashion. It will be understood that the smoothing of transitions may also be effective when operating at equal resolutions, although the preferred embodiment of the present invention is most successful with unequal horizontal and vertical dimensions.

In the preferred embodiment, the smoothing method of the present invention is applied by the co-processor 34 as it is generating each horizontal raster line 50 to be stored in the frame buffer 32. Typically, the horizontal raster lines 50 are processed from top to bottom in the frame buffer 32 and the pixels 52 are processed from left to right, although it will be recognized that the raster lines 50 and pixels 52 may be processed in any direction so long as the processing is consistent throughout an entire page in the frame buffer 32. As the decision is made whether to turn a pixel 52 on or off, a fill value representing the area between the edge of the ideal outline 54 and the edge of the pixel 52 is accumulated. Any number of methods can be used to determine the amount of the fill value for each pixel. For example, instead of calculating the entire area inside the ideal outline, the height of the midpoint of the segment of the ideal outline in the pixel or the height of the intersection of the ideal outline with the right or left edge of the pixel could be used to estimate the value of the area inside the ideal outline. Similar algorithms may be used to process short vector and curves in order to apply the smoothing method of the present invention to a variety of different shapes.

Referring to FIG. 2d, the relation of the first comparison value 57 and second comparison value 58 and the boundary transition range 59 to the pixels 52 in a raster line 50 will be shown. It can be seen that below the first comparison value 57, none of the pixel 52 are turned on. Similarly, above the second comparison value 58, all of the pixels 52 are turned on. In the boundary transition range 59 about the vertical transition point 56 and between the first and second comparison values 57 and 58, the pixels 52 are selectively modified in accordance with one of the techniques of the present invention. As shown in this embodiment, the pixels 52 are selectively modified to establish an effective 33% duty cycle on the control signal to the laser printer, i.e., two pixels off, one pixel on.

Figure 7:
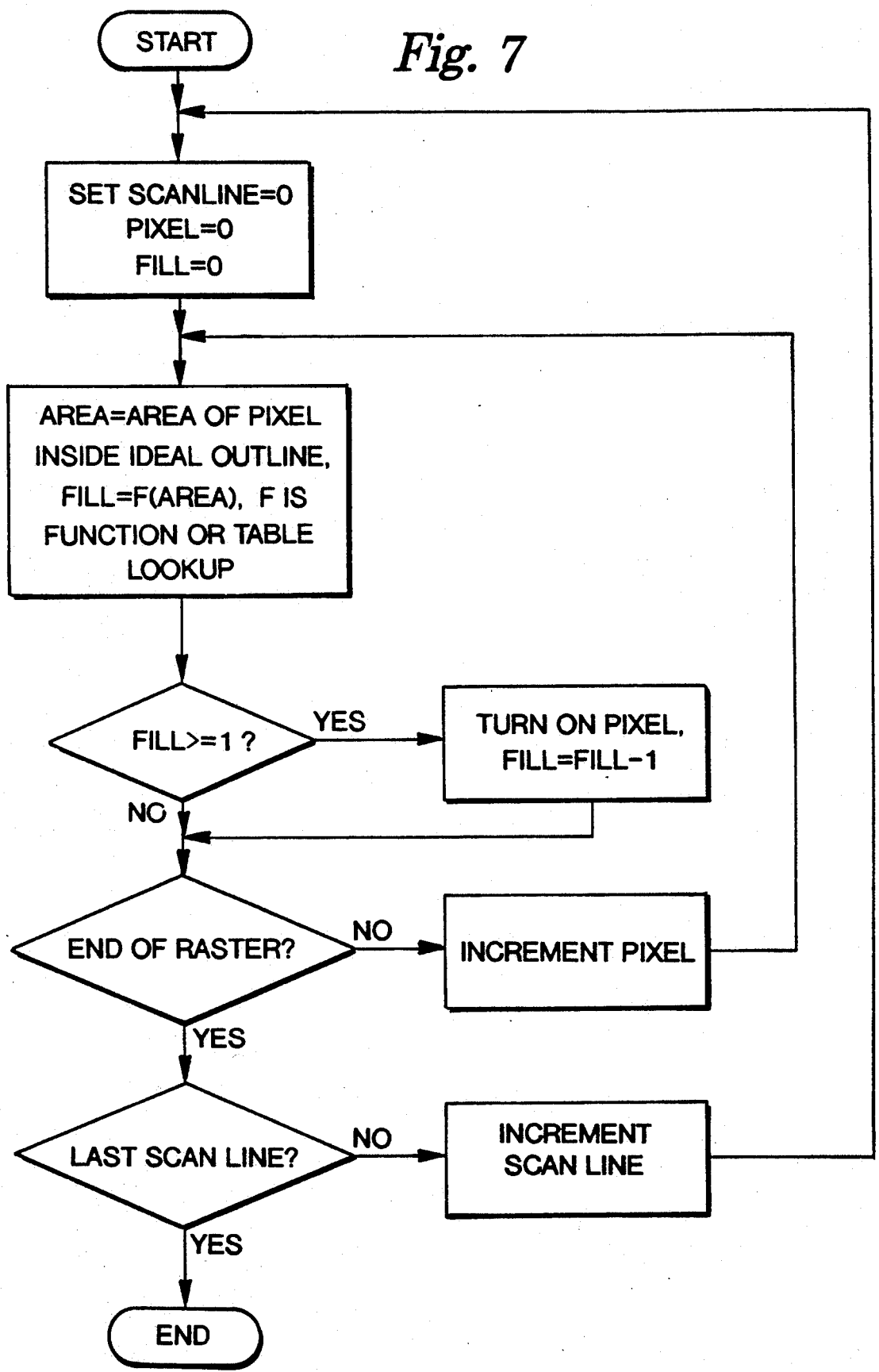
FIG. 7 is a flowchart showing the steps of the preferred embodiment of the smoothing method of the present invention.
Figure 8A:
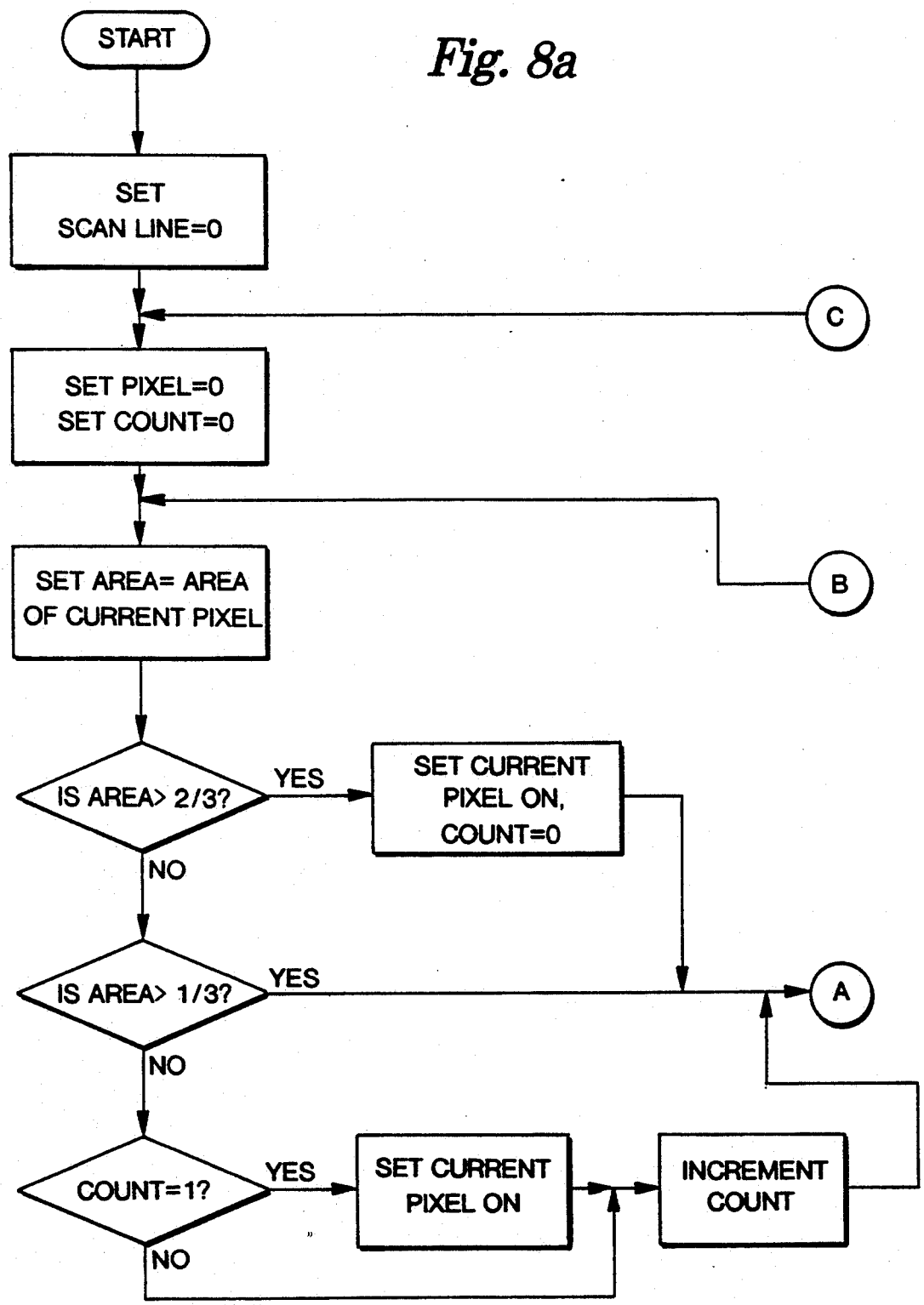
FIGS. 8A and 8B are a flowchart showing the steps of an alternative embodiment of the smoothing method of the present invention.
Figure 8B:
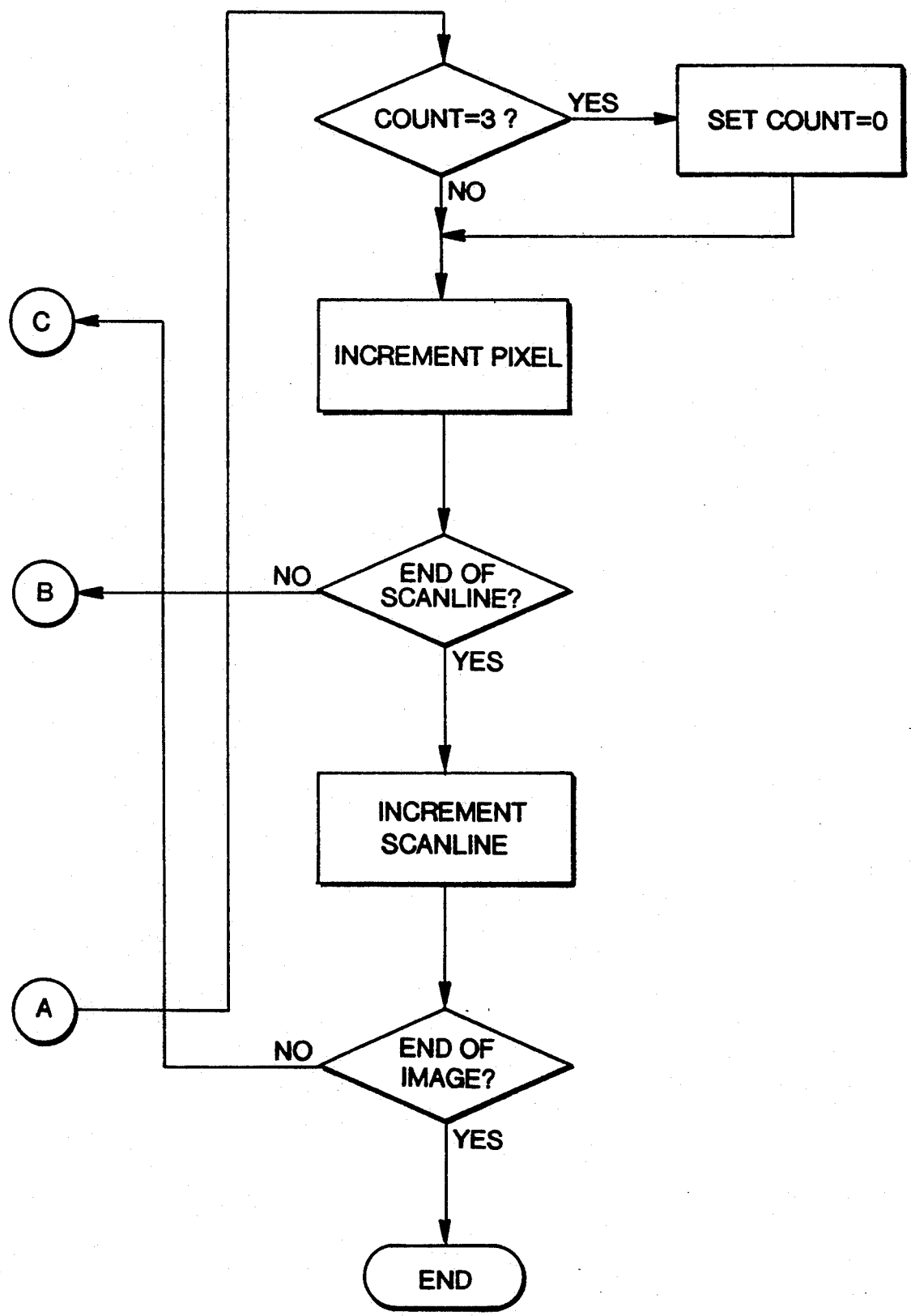

Referring now to FIGS. 7 and 8, the operation of the preferred embodiment and an alternative embodiment of the present invention are shown in terms of a traditional programming flow chart. Those skilled in the art will best understand the description of these embodiments by reference to the flow charts for the detailed description of the operation of two sample versions of a program coded in accordance with the present invention. Those skilled in the art will also recognize that there are many alternative ways of programming a processor to perform the smoothing of the edges of an outline in accordance with the present invention, and the flow chart descriptions provided in FIGS. 7 and 8 are not meant to limit the scope of the present invention.

Although the preferred embodiment of the present invention is described with respect to the filling or rasterizing of an ideal outline, it should be noted that the method of the present invention may be applied equally as well to any filled polygon where it is desired to smooth the horizontal components of the polygon when printing the image. In this situation, the ideal outline could be assumed to be a series of lines segments constructed around the outermost edges of the horizontal components of the filled polygon.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A non-gray scale anti-aliasing method for smoothing one or more edges of an image that is generated by rasterizing an ideal outline of the image using a processor means for processing a plurality of raster lines to form a pixel representation of the image to be communicated to a binary imaging printer, each raster line comprised of a plurality of pixels each having a predefined total area, the method comprising the steps of:
   for each pixel in each raster line:
   (a) determining an ideal fill area representing the area inside the ideal outline for the pixel currently being processed;
   (b) comparing the ideal fill area to at least a first and second comparison value; and
   (c) determining whether the pixel currently being processed will be turned on or turned off based upon the comparison of the ideal fill area and the first and second comparison values.

2. The method of claim 1 wherein step (c) comprises the steps of:
   (c1) if the ideal fill area is less than the first comparison value, turning the pixel off;
   (c2) if the ideal fill area is greater than the first comparison value and less than the second comparison value, selectively modifying the pixel based upon a predetermined duty cycle; and
   (c3) if the ideal fill area is greater than the second comparison value, turning the pixel on.

3. The method of claim 2 wherein step (c2) comprises the steps of:
   (c21) incrementing a count value representative of the predetermined duty cycle;
   (c22) if the count value is less than or equal to a duty cycle value representative of the predetermined duty cycle, turning the pixel on;
   (c23) if the count value is greater than the duty cycle value, turning the pixel off; and
   (c24) resetting the count value at the end of each predetermined duty cycle.

4. The method of claim 3 wherein the first comparison value=25 percent and the second comparison value=75 percent of the predefined total area of the pixel, the predetermined duty cycle=33 percent, the duty cycle value=1, and the count value is reset when the count value=3.

5. The method of claim 3 wherein the predetermined duty cycle is within a predetermined range of an upper limit and a lower limit for the duty cycle of the control signal based upon a particular binary imaging printer to which the image will be communicated.

6. The method of claim 1 wherein steps (b) and (c) comprise the steps of:
   (d1) selecting an estimated fill value by comparing the ideal fill area to a lookup table representing a set of predetermined comparison values, including at least the first and second comparison value;
   (d2) maintaining an actual fill value for the raster line by accumulating the estimated fill value; and
   (d3) if the actual fill value is greater than the total area, turning on the pixel currently being processed and resetting the actual fill value.

7. The method of claim 6 wherein the resetting the actual fill value in step (d3) is comprised of subtracting the total area from the actual fill value.

8. The method of claim 6 wherein the resetting the actual fill value in step (d3) is comprised of setting the actual fill value to zero.

9. The method of claim 1 wherein steps (b) and (c) comprise the steps of:
   (e1) selecting an estimated fill value by applying a fill function to the ideal fill area, the fill function effectively including the first and second comparison values;
   (e2) maintaining an actual fill value for the raster line by accumulating the estimated fill value; and
   (e3) if the actual fill value is greater the total area, turning on the pixel currently being processed and resetting the actual fill value.

10. The method of claim 9 wherein the resetting the actual fill value in step (e3) is comprised of substracting the total area from the actual fill value.

11. The method of claim 9 wherein the resetting the actual fill value in step (e3) is comprised of setting the actual fill value to zero.

12. The method of claim 1 wherein step (a) is accomplished by calculating the entire area inside the ideal outline.

13. The method of claim 1 wherein step (a) is accomplished by estimating the area inside the ideal outline based upon the vertical height of a midpoint of a segment of the ideal outline if the segment horizontally crosses the pixel currently being processed.

14. The method of claim 1 wherein step (a) is accomplished by estimating the area inside the ideal outline based upon the vertical height of the left edge of a segment of the ideal outline that horizontally crosses the pixel currently being processed.

15. The method of claim 1 wherein step (a) is accomplished by estimating the area inside the ideal outline based upon the vertical height of the right edge of a segment of the ideal outline that horizontally crosses the pixel currently being processed.

16. The method of claim 1 wherein the binary imaging printer is a laser printer having unequal pixel resolutions in the horizontal and vertical dimensions.

17. The method of claim 1 wherein steps (a), (b) and (c) are performed only for those raster lines having one or more vertical transition points.

18. A non-gray scale anti-aliasing method for smoothing one or more edges of an image that is generated by rasterizing an ideal outline of the image using a processor means for processing a plurality of raster lines to form a pixel representation of the image to be communicated to a binary imaging printer, each raster line comprised of a plurality of pixels each having a predefined total area, the method comprising the steps of:
for each pixel in each raster line:
(a) determining an ideal fill area representing the area inside the ideal outline for the pixel currently being processed;
(b) selecting an estimated fill value by comparing the ideal fill area to a lookup table representing a set of predetermined comparison values;
(c) maintaining an actual fill value for the raster line by accumulating the estimated fill value; and
(d) if the actual fill value is greater than the total area, turning on the pixel currently being processed and resetting the actual fill value.

19. A non-gray scale anti-aliasing method for smoothing one or more edges of an image that is generated by rasterizing an ideal outline of the image using a processor means for processing a plurality of raster lines to form a pixel representation of the image to be communicated to a binary imaging printer, each raster line comprised of a plurality of pixels each having a predefined total area, the method comprising the steps of:
for each pixel in each raster line:
(a) determining an ideal fill area representing the area inside the ideal outline for the pixel currently being processed;
(b) selecting an estimated fill value by applying a fill function to the ideal fill area, the fill function effectively including at least a first and second comparison values;
(c) maintaining an actual fill value for the raster line by accumulating the estimated fill value; and
(d) if the actual fill value is greater the total area, turning on the pixel currently being processed and resetting the actual fill value.

20. A non-gray scale anti-aliasing method for smoothing one or more edges of an image to be printed by a binary imaging printer comprising the steps of:
rasterizing an ideal outline of the image using a processor means for processing a plurality of raster lines to form a pixel representation of the image to be communicated to the binary imaging printer; and
for each of a plurality of pixels in the raster line:
determining an ideal fill area representing the area inside the ideal outline for the pixel currently being processed;
comparing the ideal fill area to at least a first and second comparison value;
determining whether the pixel currently being processed will be turned on or turned off based upon the comparison of the ideal fill area and the first and second comparison values.

21. The method of claim 20 wherein the processor means is comprised of a printer control card operably connected with a computer, the printer control card including a co-processor for rasterizing the ideal outline of the image, a frame buffer memory means for storing the pixel representation of the image to be communicated to the laser printer, and a video interface for communicating the modified pixel representation stored in the frame buffer means to the binary imaging printer to directly modulate a laser in the binary imaging printer.

22. The method of claim 20 wherein the processor means is comprised of a processor in a computer that also generates a plurality of commands and data for defining the ideal outline of the image to be printed by the binary imaging printer.

23. The method of claim 20 wherein the processor means is comprised of a processor associated with the binary imaging printer.

24. A non-gray scale anti-aliasing method for smoothing one or more vertical transition points on an edge of an image to be printed by a binary imaging printer comprising the steps of:
rasterizing an ideal outline of the image using a processor means for processing a plurality of raster lines to form a pixel representation of the image to be communicated to the binary imaging printer; and
for each of the pixels around each vertical transition point in a raster line having a fill area representing the area inside the ideal outline for the pixel currently being processed that is within a boundary transition range defined by a first and second comparison value, selectively modifying the on and off states of the pixel to smooth the vertical transition point.

25. The method of claim 24 wherein the pixels within the boundary transition range are selectively modified in response to a predetermined duty cycle.

26. The method of claim 24 wherein the pixels within the boundary transition range are selectively modified by:
selecting an estimated fill value by comparing the fill area to a lookup table representing a set of predetermined comparison values for each pixel in the boundary transition range;
maintaining an actual fill value for the raster line by accumulating the estimated fill value; and
if the actual fill value is greater the total area of a pixel, turning on the pixel currently being processed and resetting the actual fill value.

27. The method of claim 24 wherein the pixels within the boundary transition range are selectively modified by:
applying a fill function to the fill area to select an estimated fill function for each pixel in the boundary transition range;
maintaining an actual fill value for the raster line by accumulating the estimated fill value; and
if the actual fill value is greater the total area of a pixel, turning on the pixel currently being processed and resetting the actual fill value.

* * * * *